United States Patent

Kawata et al.

[11] Patent Number: 5,968,622
[45] Date of Patent: *Oct. 19, 1999

[54] CYLINDRICAL SUBSTRATE FOR ELECTROPHOTOGRAPHY

[75] Inventors: Noriaki Kawata, Nagano; Kiyoshi Nikima, Saitama, both of Japan

[73] Assignee: Fuji Electric Co., Ltd., Kawasaki, Japan

[*] Notice: This patent is subject to a terminal disclaimer.

[21] Appl. No.: 08/871,069

[22] Filed: Jun. 9, 1997

Related U.S. Application Data

[62] Division of application No. 08/620,916, Mar. 25, 1996, Pat. No. 5,681,524.

[30] Foreign Application Priority Data

Mar. 24, 1995 [JP] Japan ................................ 7-065401

[51] Int. Cl.[6] .......................... B29D 22/00; C04B 35/00; G03G 15/04; B25F 5/02
[52] U.S. Cl. .................. 428/36.9; 428/34.7; 428/35.7; 264/105; 264/104; 430/62; 430/69; 492/59
[58] Field of Search ................ 428/36.9, 35.7, 428/34.7; 264/105, 138, 104, 570; 492/59; 430/62, 69

[56] References Cited

U.S. PATENT DOCUMENTS

| | | | |
|---|---|---|---|
| 4,440,295 | 4/1984 | Blackwood-Murray et al. | 492/59 |
| 4,526,151 | 7/1985 | Tateishi et al. | 123/468 |
| 4,895,784 | 1/1990 | Shirai | 430/69 |
| 4,963,404 | 10/1990 | Jenkins | 428/34.7 |
| 5,652,077 | 7/1997 | Obinata | 430/56 |

FOREIGN PATENT DOCUMENTS 363213560  9/1988  Japan .

*Primary Examiner*—Ellis Robinson
*Assistant Examiner*—Jennifer M. Hays
*Attorney, Agent, or Firm*—Baker & Botts, L.L.P.

[57] ABSTRACT

Cylindrical tubular substrates for an electrophotographic conductor can be made with different lengths from an injection-molded plastic cylindrical mother tube. The length of the mother tube is sufficient for the greatest desired length. The mother tube has a slanting inner surface which facilitates removal of the tube from the molding die, and non-slanting inner end surfaces which can be stepped. The desired length is obtained by cutting the mother tube across one of the steps. The resulting non-slanting inner end surface of the substrate provides a spigot joint for tightly receiving a flange.

3 Claims, 1 Drawing Sheet

CYLINDRICAL SUBSTRATE FOR ELECTROPHOTOGRAPHY

This is a divisional of application Ser. No. 08/620,916 filed on Mar. 25, 1996 now U.S. Pat. No. 5,681,524.

BACKGROUND OF THE INVENTION

Field of the Invention

The present invention provides methods of manufacturing a cylindrical tubular substrate for an electrophotographic photoconductor. In particular, the present invention is directed to a method of injection molding of a plastic material for the manufacture of multiple types of electrophotographic photoconductor substrates having various lengths.

Photoconductors are used in electrophotographic apparatuses such as copy machines and printers that utilize electrophotographic techniques. Photoconductors comprise a conductive substrate and a photoconductive layer laminated on the conductive substrate. The conductive substrate is generally formed as a cylindrical tube having a peripheral layer onto which the photoconductive layer is laminated.

Aluminum and aluminum alloys have been widely used in the manufacture of the cylindrical substrates due to their light weight and excellent machinability. However, very precise machining of the peripheral surface of each cylindrical aluminum or aluminum alloy substrate is required to achieve the exact required dimensional precision and preferred surface roughness. Precise machining of both ends of the substrate is required so that a flange for rotating the substrate can be fitted at one end, and a flange for fixing the rotating shaft can be fitted at the other end of the substrate. External surface contaminations must be washed from the substrate before forming the photoconductive layer. Since the aluminum or aluminum alloy surface is sensitive to the storage environment, it is necessary to adopt countermeasures against surface alteration, such as covering the substrate surface with an oxide film. Accordingly, multiple steps and high costs are associated with the manufacture of aluminum and aluminum alloy substrates.

Japanese Examined Patent Publication No. H02-17026 (JP 90017026) discloses a cylindrical substrate that is lighter in weight than an aluminum or aluminum alloy substrate, highly chemically and thermally resistant, neither oxidized nor deformed by air, and compatible with photoconductors. The cylindrical substrate is manufactured by injection molding of a material containing a polyphenylene sulfide (PPS) resin.

Manufacture of aluminum or aluminum alloy substrates of different lengths is accomplished by manufacturing a long cylindrical tubing, for example by drawing, cutting the tubing at every desired length, and forming spigot joints for inserting flanges on both open ends of the cut tube. In contrast, substrates of the plastic material may be formed together with the spigot joints by injection molding with a molding die of the desired shape and dimension. The shape and dimension of each cylindrical substrate are thus defined by the particular molding die used in injection molding. Accordingly, multiple molding dies are necessary to manufacture cylindrical substrates of different lengths.

Another disadvantage of the prior art methods of manufacturing cylindrical substrates results from the slanted inner surfaces of the substrate tubes. The core die, a part of an injection molding die, has a slanted surface to allow the molded substrate to be easily removed from the molding die. The slanted surface of the core die causes slanting of the inner surface of the cylindrical substrate tube with respect to its axis of rotation. Due to the slanted inner surface of the cylindrical substrate, flanges fixed on the open ends of the substrate tubes tend to slip out of the substrate tubes.

Accordingly, there is a need in the art for better methods of manufacturing photoconductor substrates. The present invention solves the problems of the prior art methods by providing a method for manufacturing multiple plastic photoconductor substrates by using a single molding die. The photoconductor substrates made by the present method have differing lengths, and open ends to which flanges can be secured tightly.

SUMMARY OF THE INVENTION

The present invention provides a method of making a plastic cylindrical tubular substrate for an electrophotoconductor. The method comprises forming a cylindrical mother tube for the substrate by injection molding. The cylindrical mother tube comprises a first part having an inner diameter that is greater on a first end thereof than on a second end thereof, such that the inner surface of the first part of the mother tube is slanted. The mother tube further comprises a second part adjacent to and coextensive with the first end of the first part, and a third part adjacent to and coextensive with the second end of the first part, wherein said second and third parts have non-slanted inner surfaces. The inner surface of the second part comprises at least one step extending in parallel to the axis of rotation of the mother tube wherein the first step is adjacent to the first end of the first part, and the inner diameter of the second part at the first step is greater than the inner diameter of the first end of the first part. The inner diameter of the second part increases at each step with increasing distance from the first end of the first part. The length of each step is equal to or greater than the predetermined insertion length of a flange to the substrate. The method of the invention further comprises cutting the mother tube across one of the steps of the second part in perpendicular to the axis of rotation such that the length of the step that remains in the mother tube is equal to or greater than the insertion length of a flange to the substrate, thereby forming the substrate. In a preferred embodiment, the mother tube has more than one step in the inner surface in the second part.

In another preferred embodiment, the plastic comprises a PPS resin, carbon black, glass fiber and an inorganic filler.

In another embodiment, the cutting of the mother tube is conducted with a band saw or a water knife. Preferably, cutting with a water knife is conducted by rotating the mother tube horizontally around its axis of rotation and moving the water knife's water nozzle horizontally in the rotating direction of the mother tube and perpendicular to the axis of rotation.

DETAILED DESCRIPTION OF THE INVENTION

Figure 1:
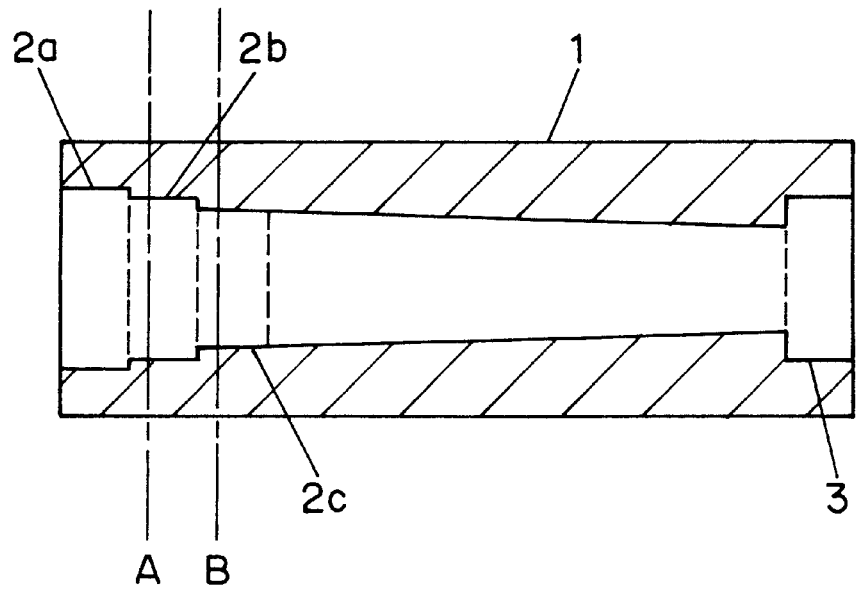
FIG. 1 is a longitudinal cross-section of a cylindrical mother tube for the substrate of the present invention. Three inner steps (2a, 2b and 2c) are formed on an inner surface of the second part adjacent to the first end of the first part and provide three different inner diameters in the second part. The inner surface at steps 2a, 2b and 2c extends in parallel to the axis of rotation of the mother tube (1). The inner surface of the second part is referred to herein as the "non-slanted inner surface". The inner surface of the first part of the mother tube (1) slants to the axis of rotation of the mother tube so that the mother tube (1) may be easily pulled out from the molding die. Another non-slanted inner surface (3) is adjacent to the second end of the first part of the mother tube.

The present invention provides a method of making a cylindrical tubular substrate for an electrophotographic photoconductor. In accordance with the present invention, substrates having a variety of lengths may be manufactured with a single molding die by injection molding a plastic cylindrical mother tube and cutting the mother tube perpendicular to its axis of rotation to provide a tube of the desired length. A molding die is first prepared, with which mother tubes having the longest desired lengths are molded. The mother tubes are then cut into shorter tubes to provide cylindrical tubular substrates having a variety of desired lengths. The present invention thus obviates the need for multiple molding dies to produce substrates of varying lengths.

The cylindrical mother tube manufactured by injection molding has a slanted inner surface to facilitate pulling the mother tube out from the molding die. More particularly, the mother tube has a first part having an inner diameter that is greater on a first end than on a second end, such that the inner surface of a first part of the mother tube is slanted. Consequently, the cylindrical tubular substrates similarly have a slanted inner surface slanting toward their axis of rotation.

The cylindrical mother tube of the present invention further has non-slanted inner surfaces at each end. At one end of the mother tube, the non-slanted surface may be provided as a series of steps, providing an increasing inner diameter with increasing distance from the slanted inner surface. The mother tube is then cut across one of these inner steps to provide the cylindrical tubular substrate. Substrates of different lengths can be made by cutting across the appropriate step.

The resulting cylindrical tubular substrate is suitable for coating with a photoconductive layer on its outer surface. The cylindrical tubular substrate may be fitted with a flange at each end. For example, one flange may be part of a rotating shaft for driving the cylindrical substrate, and the other flange may be part of a rotating shaft for supporting the cylindrical substrate. Both rotating shafts may be included in a copy machine, for example.

In the cylindrical tubular substrates of the prior art that have slanted inner surfaces, it is difficult to tightly affix an inserted flange to the end of the substrate having the greater inner diameter, since the flange tends to slip on the slanted inner surface. This problem is obviated in accordance with the present invention by providing the above described ends having non-slanted inner surfaces. In particular, the mother tube has a second part and a third part adjacent to an coextensive with the first and second ends, respectively, of the first part. Each of the second part and the third part has a non-slanted inner surface that extends in parallel to the axis of rotation of the mother tube, and a length that is equal to or greater than the insertion length of a flange to the open end of the tubular substrate. The flange has a predetermined length. The cylindrical tubular substrate is formed by cutting the mother tube across the non-slanting inner surface of the second part, i.e. at one end, in perpendicular to the axis of rotation at a position such that the length of the remaining non-slanted inner surface is equal to or greater than the insertion length of a desired flange. In particular, the length of the non-slanted inner surface that remains in the substrate is equal to or greater than the insertion length of the flange. Thus each end of the tubular substrate has a non-slanted inner surface and can form a spigot joint for tightly fixing an inserted flange.

In order to obviate problems that may be associated with pulling a mother tube having a long non-slanted inner surface from the molding die, in a preferred embodiment of the present invention the non-slanted inner surface of the second part of the mother tube comprises one or more steps, and most preferably comprises more than one step. Each of the steps extends in parallel to the axis of rotation of the mother tube and has a length that is equal to or greater than the predetermined insertion length of a flange to the substrate. The first step is adjacent to the first end of the first part. The inner diameter of the second part of the mother tube changes stepwise at each step. In particular, the inner diameter at the first step is greater than the inner diameter of the first end of the first part, and the inner diameter of the second part increases at each step with increasing distance from the first part. The cylindrical mother tube is then cut across any one of the steps in perpendicular to the axis of rotation, at a position such that the length of the step that remains adjacent to the first part is equal to or greater than the insertion length of a flange to the substrate, thereby forming the substrate. By forming a mother tube with multiple steps, the inner diameter of the second part is varied in a stepwise fashion. By cutting the mother tube at a selected step, a cylindrical substrate of desired length is provided, and a single die mold can be utilized to form cylindrical substrates of varying lengths. In embodiments having only one step in the inner surface of the second part, the cylindrical substrate may be formed by omitting the step of cutting. The mother tube further comprises a third part adjacent to the second end of the first part, wherein the third part has a non-slanted inner surface. The length of the third part is equal to or greater than the predetermined insertion length of a flange to the substrate.

The cutting of the mother tube is performed by methods known to one of ordinary skill in the art. In a preferred embodiment, the mother tube is cut with a band saw or a water knife to form the cylindrical substrate.

In accordance with the present invention, it has been discovered when a water knife is used, the cylindrical tube can be cut with excellent precision by rotating the mother tube horizontally around its axis of rotation and moving the water knife's water nozzle horizontally in the rotating direction of the mother tube and perpendicular to the axis of rotation.

The cylindrical mother tube of the present invention is preferably made of a plastic material. In a preferred embodiment the plastic material comprises PPS resin. In another preferred embodiment the plastic material comprises PPS resin, carbon black, glass fiber, and an inorganic filler. In a more preferred embodiment, carbon black is present in an amount of about 15% by weight, glass fiber is present in an amount of about 20% by weight, and the inorganic filler is clay and is present in an amount of about 20% by weight.

Figure 2:
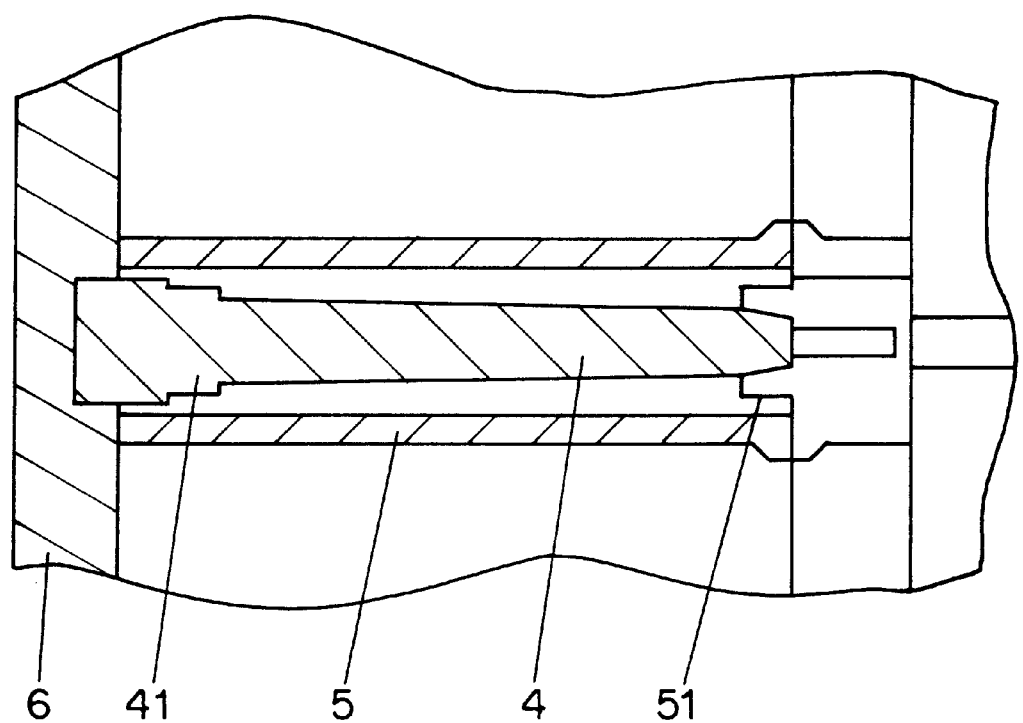
FIG. 2 is a cross-section of a representative molding die in accordance with the present invention. The mother tube (1) in FIG. 1 is formed by injection molding with the molding die of FIG. 2. The molding die comprises: a core die (4) having a slanted surface converging at the top end, and a stepped portion (41) having non-slanted surfaces adjacent to the bottom end of the slanted surface; a fixed die (6) for holding the core die (4); a cavity die (5) having a non-slanted surface, a step portion (51) at a position corresponding to the top end of the core die (4), and a gate for material loading (not shown). The core die (4) with the step portion (41) allows the formation of non-slanted inner surfaces at steps 2a, 2b and 2c of mother tube (1) shown in FIG. 1. The step portion (51) of the cavity die (5) allows the formation of non-slanted inner surface (3) of the mother tube (1) of FIG. 1.

The cylindrical mother tube of the present invention is formed by injection molding. For example, a mother tube such as the one depicted in FIG. 1 may be formed by injection molding with a molding die, for example as shown in FIG. 2. In a preferred embodiment, the die temperature is set at between 120 and 150° C., the molding material temperature is set at about 280 to 330° C., and the molding material is loaded within from about 0.05 to 2.5 seconds. In accordance with the method of the present invention, the mother tube is then cut perpendicular to the axis of rotation of the tube, for example along a cutting section A crossing the non-slanted inner surface at step 2b of FIG. 1, or along a cutting section B crossing the non-slanted inner surface at step 2c of FIG. 1. Thus in accordance with the present invention, substrates of differing lengths can be obtained from a single molding die by cutting the mother tube at an appropriately chosen section of the second part of the mother tube. Alternatively, the mother tube may be used without being cut. When the mother tube is cut, for example at section A or B of the step depicted in FIG. 1, the portion of the step that remains in the mother tube is equal to or greater than the insertion length of a flange. The portion of the step that remains after cutting, or the entire step in embodiments in which the mother tube is not cut, provides a spigot joint for inserting a flange. In FIG. 1, the non-slanted surface (3) at the second end of the first part of the mother tube also provides a spigot joint for fixing an inserted flange.

The following examples further illustrate the present invention.

EXAMPLE 1

A mother tube was formed to be 30 mm in outer diameter and about 1 mm in thickness by injection molding of a PPS resin to which are added 15 weight % of carbon black, 15 weight % of glass fiber, and 20 weight % of clay as an inorganic filler. The mother tube was cut by a band saw.

The mother tube was cut perpendicularly to the axis of rotation thereof by a band saw (Type VA500 supplied from AMADA CO., LTD.), having a saw tooth width of 1 mm and 14 teeth per inch, with the circumferential velocity of 300 m/min, 600 m/min, 900 m/min, or 1200 m/min. Profiles of the cut surfaces and chipping thereof were evaluated by visual observation. Profiles of the cut surface were evaluated as very smooth (o) or a little rough (Δ). Chipping was evaluated as existent (x) or non-existent (o). Chipping is defined as the breaking off of tiny chips or chipping of the cutting edge in response to cutting. Non-existence of chipping (o) means that pits and traces are not observable. Precision of the length of the cut-out substrate was also evaluated. The results are listed in Table 1.

TABLE 1

| Circumferential speed of saw teeth (m/min) | Profile of cut surface | Chipping | Precision of length (mm) |
| --- | --- | --- | --- |
| 300 | Δ | x | ±0.2 |
| 600 | o | o | ±0.1 |

TABLE 1-continued

| Circumferential speed of saw teeth (m/min) | Profile of cut surface | Chipping | Precision of length (mm) |
| --- | --- | --- | --- |
| 900 | o | o | ±0.1 |
| 1200 | Δ | x | ±0.2 |

EXAMPLE 2

A mother tube, molded in the same manner as the mother tube of Example 1, was cut with a water knife (Model 20X supplied from FLOW CO., LTD.) which has a water nozzle 0.08 mm in diameter. The water nozzle was spaced by 3 mm from the surface of the mother tube. Cutting of the mother tube was conducted under water pressure of 300 to 400 MPa with the movements of the mother tube and water knife varied as described below.

Cutting condition 1:

The mother tube, the axis of rotation of which was held horizontally, was not rotated, and the water nozzle was moved horizontally in perpendicular to the axis of rotation of the mother tube.

Cutting condition 2:

The mother tube was rotated along its axis of rotation, which was held horizontally, and the water nozzle was held still (not moved).

Cutting condition 3:

The mother tube was rotated around its axis of rotation, which was held horizontally, and the water nozzle was moved horizontally in perpendicular to the axis of rotation of the mother tube.

As a result of comparing these three cutting conditions, it was found that excellent cutting is facilitated by moving the water nozzle horizontally in perpendicular to the axis of rotation of the mother tube, and by rotating the mother tube in the moving direction of the water nozzle. Then, cutting was conducted by moving the water nozzle at 15 mm/min horizontally in perpendicular to the axis of rotation of the mother tube and by rotating the mother tube in the moving direction of the water nozzle with the rotation rate of the cylindrical mother tube varied variously. Profiles of the cut surfaces, chipping on the cut surfaces, and precision of the resultant substrate length were evaluated in the same way as in Example 1. Results are listed in Table 2.

TABLE 2

| Rotation rate of mother tube (revolutions/sec) | Profile cut surface | Chipping | Precision of length (mm) |
| --- | --- | --- | --- |
| 0 | Δ | x | ±0.2 |
| 2.5 | o | o | ±0.1 |
| 5.0 | o | o | ±0.1 |

As indicated by Table 2, excellent cutting was achieved by moving the water nozzle at 15 mm/min and by rotating the mother tube at 2.5 to 5 rounds per sec.

We claim:

1. A plastic cylindrical tubular substrate for an electrophotographic photoconductor, comprising:
   an injection-molded cylindrical mother tube having an axis of rotation, the mother tube comprising
   (a) a first part having an inner surface which has an inner diameter which is greater at a first end thereof than at a second end thereof so that the inner surface of the first part of the mother tube is slanted, (b) a second part adjacent to and coextensive with the first end of the first part, having a non-slanted inner surface which extends in parallel to the axis of rotation of the mother tube, which has a length which is greater than a preselected insertion length of a flange to the tubular substrate, and which has an inner diameter which is greater than the inner diameter of the first end of the first part, and (c) a third part adjacent to and coextensive with the second end of the first part, having a non-slanted inner surface which extends in parallel to the axis of rotation of the mother tube, which has a length which is equal to or greater than a preselected insertion length of a second flange to the tubular substrate, and which has an inner diameter which is greater than the inner diameter of the second end of the first part.

2. The substrate according to claim 1, wherein said plastic comprises polyphenylene sulfide resin, carbon black, glass fiber and an inorganic filler.

3. The substrate according to claim 2, wherein said carbon black is present in an amount of about 15% by weight, said glass fiber is present in an amount of about 20% by weight, and said inorganic filler is clay and said clay is present in an amount of about 20% by weight.

* * * * *